United States Patent [19]

Beloglazov et al.

[11] 4,373,399
[45] Feb. 15, 1983

[54] SEMICONDUCTOR STRAIN GAUGE TRANSDUCER

[76] Inventors: Alexei V. Beloglazov, poselok Khlebnikovo, Stantsionnaya ulitsa, 5, kv. 12, Moskovskaya oblast; Vladimir E. Beiden, K-482, korpus 4, kv. 2, Moscow; Georgy G. Iordan, ulitsa 26 Bakinskikh komissarov, 3, kv. 1, Moscow; Vladimir M. Karneev, Leningradskoe shosse, 8/2, kv. 346, Moscow; Vladimir S. Papkov, K-498, korpus 405, kv. 18, Moscow; Vladimir M. Stuchebnikov, ulitsa Gotvalda, 15, kv. 51, Moscow; Viktor V. Khasikov, Sadovo-Spasskaya, ulitsa, 21, kv. 5, Moscow; Mikhail V. Surovikov, K-527, korpus 906, kv. 170, Moscow, all of U.S.S.R.

[21] Appl. No.: 231,890

[22] Filed: Feb. 5, 1981

[51] Int. Cl.³ .............................................. G01B 7/16
[52] U.S. Cl. ...................................... 73/777; 73/727; 338/22 SD
[58] Field of Search .................. 73/777, 727, 754; 338/22 SD

[56] References Cited

U.S. PATENT DOCUMENTS

3,916,365  10/1975  Giachino ...................... 73/727 X
4,191,057  3/1980  Busta ................................ 73/777

FOREIGN PATENT DOCUMENTS

193769  3/1967  U.S.S.R. .

OTHER PUBLICATIONS

Schlumberger, Fiche Technique 76008, May 1976.
Electronnaya technika/Electronic Engineering/, Series II, Issue 2, 1976, p. 43.

*Primary Examiner*—Jerry W. Myracle
*Attorney, Agent, or Firm*—Lilling & Greenspan

[57] ABSTRACT

A semiconductor strain gauge transducer comprising a sensitive element which is a monocrystal sapphire substrate carrying epitaxial silicon strain gauges of p-type conduction. The hole concentration in the silicon is $3.5 \cdot 10^{19}$ to $3 \cdot 10^{20}$ cm$^{-3}$. The silicon strain gauges are interconnected to form a bridge or differential strain-sensitive circuit.

4 Claims, 11 Drawing Figures

SEMICONDUCTOR STRAIN GAUGE TRANSDUCER

FIELD OF THE INVENTION

The present invention relates to the manufacture of semiconductor instrumentation and, more particularly, to semiconductor strain gauge transducers for measuring heat power and mechanical parameters, such as forces, pressures, displacements, accelerations, etc.

DESCRIPTION OF THE PRIOR ART

There is known a semiconductor pressure transducer (cf. Schlumberger, Fiche Technique 76008, Mai 1976) comprising a sensitive element which is a monocrystal silicon plate of n-type conduction. Strain gauges are provided in the plate by diffusion of an acceptor impurity into said plate. The strain gauges are insulated from one another by p-n junctions produced by the diffusion. The strain gauges are interconnected into a bridge or differential strain-sensitive circuit whose output signal is proportional to a parameter being measured, such as pressure. Apart from the parameter being measured, the output signal of the strain-sensitive circuit is influenced by the temperature, which accounts for a certain error in the measurements. To take care of this error, the strain gauge transducer is provided with an individually adjustable electronic circuit for temperature compensation of the output signal.

The strain gauge transducer under review can only operate at temperatures below 120° C., because the silicon p-n junctions lose their insulation properties at higher temperatures.

Besides, this transducer has a relatively low sensitivity, because the supply voltage, proportional to the output signal, is limited by the p-n junction breakdown voltage $U_b$ which normally amounts to just a few volts.

It must further be pointed out that the existing individually adjustable circuits do not provide for a required conversion accuracy at temperature intervals greater than 120° C. This is due to the fact that the output signal of the strain gauge transducer is strongly and non-linearly dependent on the operating temperature (which, in turn, is due to the fact that the electric parameters of semiconductor strain gages, including silicon strain gauges, are temperature-dependent). The existing semiconductor materials that go into the manufacture of strain gauges are such that the output signal of a strain-sensitive circuit incorporating such strain gauges is never independent of temperature.

There is known a sensitive element (a strain-gauge for a strain gauge transducer (cf. USSR Inventor's Certificate No. 193,769 of Mar. 13, 1967). The sensitive element is made of silicon carbide with a nitrogen concentration of $7.3 \cdot 10^{15}$ cm$^{-3}$ and exhibits stable tensometric characteristics at temperatures of up to 800° C.

However, the resistance of silicon carbide with the above nitrogen concentration is significantly dependent on temperature which accounts for a temperature instability of the output signal.

The sensitive element under review is an individual strain gauge which has to be attached to an elastic member of the strain gauge transducer; however, the adhesive layer exhibits hysteresis and creep.

There is known a semiconductor pressure gauge transducer (cf. Electronnaya technika/Electronic Engineering/, Series II, Issue 2, 1976, p.43) comprising a sensitive element which is a monocrystal sapphire substrate carrying epitaxial strain gauges made of monocrystal silicon film of p-type conduction. The strain gauges are interconnected into a strain-sensitive bridge circuit whose output is connected to an input of a signal conversion unit. The strain gauges are of silicon film with a resistivity of 0.005 to 0.009 Ohm-cm, which corresponds to the hole concentration: $p = 3.2 \cdot 10^{19} + 1.4 \cdot 10^{19}$ cm$^{-3}$. Such a transducer is free from the disadvantages inherent in the presence of a p-n junction.

However, the strain gauges, which make up the bridge circuit, have different temperature resistance coefficients, wherefore the zero unbalance voltage across the bridge is strongly dependent on temperature, which affects the accuracy of conversion.

Besides, the output signal of the strain gauge transducer under review is also strongly dependent on temperature. To ensure a high accuracy of measurements, the transducer has to be provided with a complicated, individually adjustable temperature compensation circuit. However, such a circuit is a factor that limits the working temperature range; in the case under review this range is only 20°+42° C.

SUMMARY OF THE INVENTION

It is an object of the present invention to improve the accuracy of conversion and considerably expand the working temperature range of the semiconductor strain gauge transducer.

The foregoing object is attained by providing a semiconductor strain gauge transducer comprising a sensitive element which is a monocrystal sapphire substrate carrying epitaxial silicon strain gauges made of silicon of p-type conduction interconnected into a bridge or differential strain-sensitive circuit whose output is connected to an input of a signal conversion unit; which strain gauge transducer is characterized, according to the invention, in that the hole concentration in the silicon is $3.5 \cdot 10^{19}$ to $3 \cdot 10^{20}$ cm$^{-3}$.

If a d.c. current source is used to feed current to the strain-sensitive circuit, it is expedient that the hole concentration in the silicon should be $(3.5+9)10^{19}$ cm$^{-3}$.

If a d.c. voltage source is used to power the strain-sensitive circuit, it is expedient that the hole concentration in the silicon should be $(1.8+3)10^{20}$ cm$^{-3}$.

A strain gauge transducer of a simple design can ensure accurate measurements within a broad range of positive and negative temperatures if the sapphire substrate, which carries a strain-sensitive circuit powered by a d.c. source, should carry an additional strain-sensitive circuit powered by a d.c. voltage source; the outputs of both strain-sensitive circuits should be connected to an input of a signal conversion unit via a relay-type switching element whose control circuit contains an epitaxial thermistor of silicon with a hole concentration of $3.5 \cdot 10^{19}$ to $3 \cdot 10^{20}$ cm$^{-3}$, which thermistor is either located in a non-stressed zone or oriented in the strain-insensitive direction of the sapphire substrate.

The semiconductor strain gauge transducer according to the invention exhibits a number of advantages over conventional transducers. It features an improved conversion accuracy and a much broader working temperature range of −200° to +200° C. The output signal of the strain-sensitive circuit is independent of temperature, which makes it possible to dispense with an electronic temperature compensation circuit; as a result, the transducer features a simple signal conversion circuit.

BRIEF DESCRIPTION OF THE DRAWINGS

Other objects and advantages of the present invention will become more apparent from a consideration of the following detailed description of preferred embodiments thereof, taken in conjunction with the accompanying drawings, wherein.

DETAILED DESCRIPTION OF THE INVENTION

Figure 1:
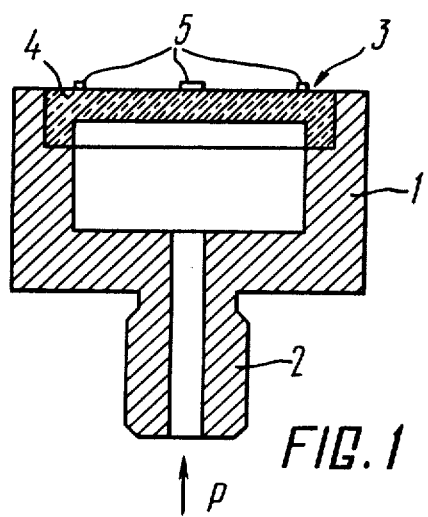
FIG. 1 is an cross sectional view of a semiconductor pressure transducer in accordance with the invention.
Figure 2:
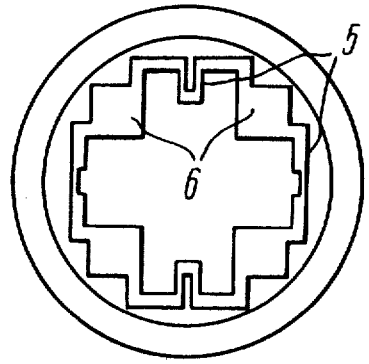
FIG. 2 is a top plan view of the transducer of FIG. 1.

FIGS. 1 and 2 show an embodiment of the invention, which is a pressure transducer comprising a cylindrical body 1 communicating on one side with a pipe 2 intended to apply pressure P. Attached to the opposite side of the body 1 by any known method, such as soldering, is a sensitive element 3. The sensitive element 3 comprises a sapphire substrate 4 which is a membrane with a swelling along its periphery, and epitaxial silicon strain gauges 5 arranged in parallel pairs at the edge of the membrane and extending at a perpendicular to the radius of the membrane. The crystallographic orientation of the plane of the sapphire substrate 4 is $\overline{1}012$. The epitaxial silicon strain gauges 5 are arranged in the crystallographic plane (100) of silicon and oriented in the directions [011] and [0$\overline{1}$1]; the strain gauges 5 have contact areas 6.

Figure 3:
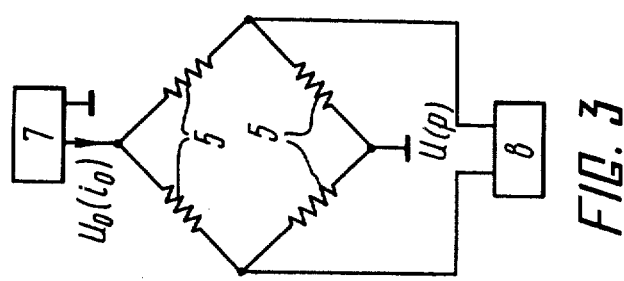
FIG. 3 is a circuit diagram of a strain gauge transducer featuring a bridge connection of the strain gauges, in accordance with the invention.

The strain gauges 5 are interconnected into a bridge circuit shown in FIG. 3. One diagonal of the bridge is connected to a power unit 7 which is either a source of direct current $i_o$ or a source of d.c. voltage $U_o$. The other diagonal of the bridge serves as the output of the strain-sensitive circuit and is connected to the input of a signal conversion unit 8.

The semiconductor pressure transducer according to the invention operates as follows. When power is fed to the bridge circuit in the absence of pressure P, the membrane 4 is not strained so that the resistance of the strain gauges 5 is maintained at its original level and the output signal of the balanced bridge is zero. As pressure P is applied to the membrane 4, the sapphire substrate bends and deforms the silicon gauges 5. The deformation changes the resistance R of the gauges 5; the sign of the change of resistance is determined by the direction of the gauges 5 with respect to the radius of the membrane 4.

The relationship between the resistance R of a strain gauge 5 and temperature T and strain $\epsilon$ can be expressed as follows:

$$R(T,\epsilon) = R(T)[1 + K(T)\epsilon], \tag{1}$$

where K(T) is the strain gauge factor. If d.c. voltage $U_o$ is fed to the bridge circuit, the output signal U of the bridge can be described as:

$$U(T,\epsilon) = U_o K(T)\epsilon; \tag{2}$$

if direct current $i_o$ is fed to the bridge circuit, the output signal U of the bridge is as follows:

$$U(T,\epsilon) = i_o R(T)K(T)\epsilon. \tag{2'}$$

The strain $\epsilon$ of the strain gauge is proportional to the parameter S being measured, which in this case is pressure P; thus $$\epsilon = A(T)S. \tag{3}$$

Hence the output signal may be described as:

$$U(T, S) = U_o K(T)A(T)S \tag{4}$$

if d.c. voltage $U_o$ is fed to the bridge circuit, and as:

$$U(T, S) = i_o R(T)K(T)A(T)S \tag{4'}$$

if direct current $i_o$ is fed to the bridge circuit.

To make the output signal independent of temperature, the following conditions must be satisfied:

$$\frac{1}{U} \frac{\partial U}{\partial T} = 0, \text{ i.e.} \tag{5}$$

$$\frac{1}{K(T)} \frac{\partial K(T)}{\partial T} + \frac{1}{A(T)} \frac{\partial A(T)}{\partial T} = 0,$$

if d.c. voltage is fed to the bridge circuit, and $$\frac{1}{R(T)} \frac{\partial R(T)}{\partial T} + \frac{1}{K(T)} \frac{\partial K(T)}{\partial T} + \frac{1}{A(T)} \frac{\partial A(T)}{\partial T} = 0, \tag{5'}$$

if direct current is fed to the bridge circuit.

The resistance temperature coefficient of the strain gauges is $$\alpha_R = \frac{1}{R(T)} \frac{\partial R(T)}{\partial T};$$

the gauge factor temperature coefficient is $$\alpha_k = \frac{1}{k(T)} \frac{\partial k(T)}{\partial T};$$

the elastic conversion temperature coefficient of the strain gauge transducer is $$\alpha_A = \frac{1}{A(T)} \frac{\partial A(T)}{\partial T};$$

thus equations (5) and (5') can be written as:

$$\alpha_k + \alpha_A = 0 \qquad (6)$$

and $$\alpha_R + \alpha_K + \alpha_A = 0 \qquad (6')$$

Considering that $\alpha_A$ is normally of a small value, the conditions which must be satisfied so as to make the output signal of the bridge circuit independent of temperature can be expressed as follows:

$$\alpha_k \approx 0 \qquad (7)$$

if d.c. voltage is fed to the bridge circuit, and $$\alpha_R + \alpha_K \approx 0 \qquad (7')$$

if direct current is fed to the bridge circuit. Equations (6) and (6') and (7) and (7') equally apply to the case when the strain gauges make up a differential circuit.

The properties of the monocrystal silicon film grown on the sapphire substrate (sos) differ strongly from those of bulk silicon crystals grown from melt or of silicon obtained by diffusion or autoepitaxial growth. The silicon film on sapphire is strongly compressed due to different thermal expansion coefficients of silicon and sapphire. Due to the piezoresistance effect caused by the compression of the film, the initial working point of a sos strain gauge is displaced with respect to the initial working point of a silicon strain gauge made of bulk diffused or autoepitaxial silicon. The displacement changes the gauge factor $K = \Delta R/R\epsilon$ and gauge factor temperature coefficient $\alpha_k$, because said displacement depends on temperature.

Besides, the piezoresistance effect caused by thermal compression of silicon film on sapphire also changes the resistance R so sos strain gauge, as compared to non-strained silicon; it also changes $\alpha_R$ of the strain gauge, keeping in mind that thermal compression depends on temperature. Thus $\alpha_R$ and $\alpha_k$ of monocrystal silicon film on a sapphire substrate differ from the respective values for bulk, diffused or autoepitaxial silicon.

Figure 4:
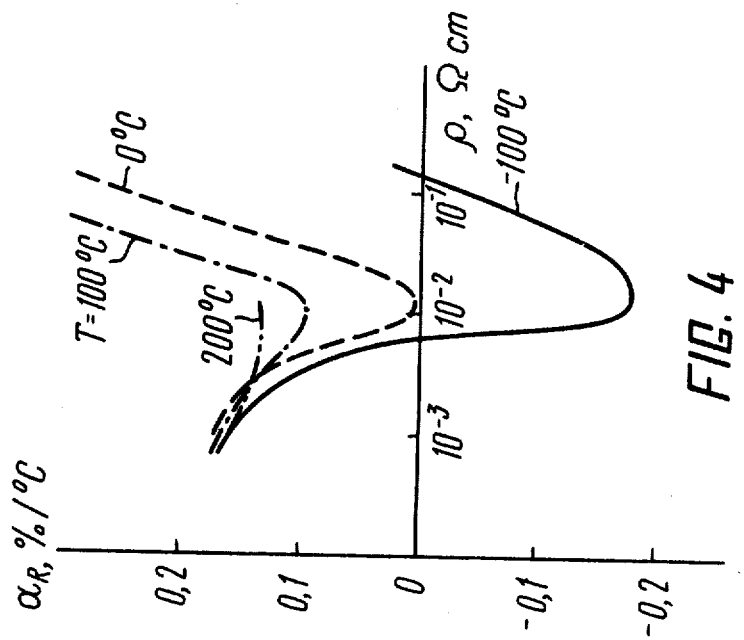
FIG. 4 is a graph, showing a plot of the resistance temperature coefficient of p-type silicon films on sapphire versus resistivity.

The strain gauges 5 of the pressure transducer of FIGS. 1 and 2 comprise boron-doped film of silicon on a sapphire substrate; the hole concentration in silicon is $3.5 \cdot 10^{19}$ to $3 \cdot 10^{20}$ cm$^{-3}$, which corresponds to a resistivity $\rho = 0.0045 + 0.0006$ Ohm-cm. FIG. 4 is a plot of the resistance temperature coefficient ($\alpha_R$) of monocrystal silicon film on a sapphire substrate versus resistivity at different temperatures T. The plot makes it clear that within the selected resistivity range, the resistance temperature coefficient of the strain gauges varies but slightly over a broad range of T and is only slightly dependent on the resistivity of the epitaxial silicon film. With the above hole concentration, the unavoidable differences of the resistivity of individual strain gauges have little effect on the resistance temperature coefficients; hence the zero unbalance voltage of the bridge is practically independent of temperature. Besides, with the above hole concentration, the effect of saturation of the acceptor impurity in the silicon improves the uniformity of the electrical properties of the epitaxial layer, which further reduces the differences in the resistivity of individual strain gauges and makes the zero unbalance voltage still less dependent on temperature.

Figure 5:
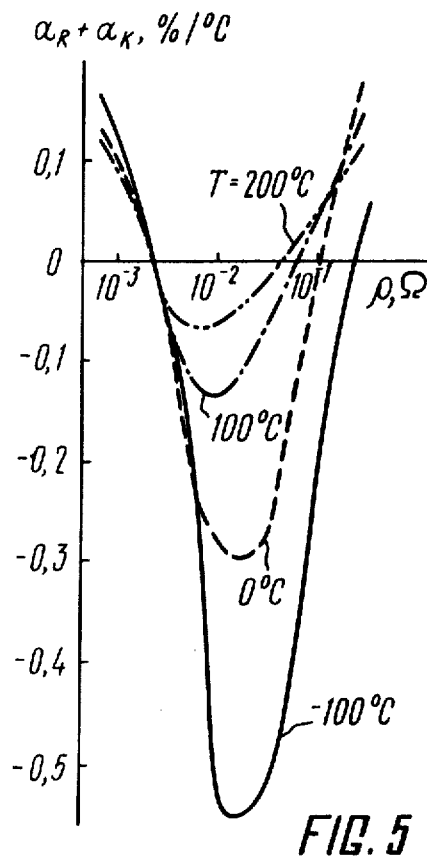
FIG. 5 is a graph, showing a plot of the sum total of the resistance temperature coefficient and strain sensitivity coefficient of silicon films on p-type sapphire versus resistivity.
Figure 11:
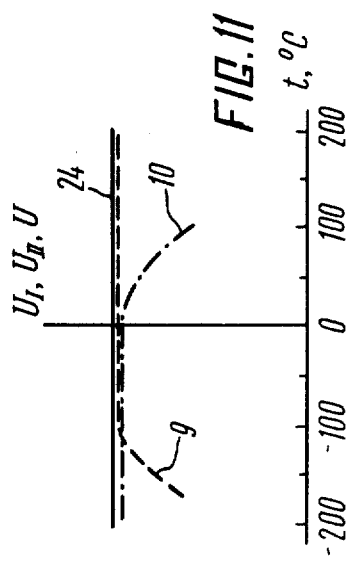
FIG. 11 is a graph, showing a plot of output signals of the strain-sensitive circuits and controlled switching element versus temperature.

According to an alternative embodiment of the pressure transducer of FIGS. 1 and 2, the strain gauges 5 comprise boron-doped film of silicon on a sapphire substrate; the hole concentration in silicon is $(3.5 + 9)10^{19}$ cm$^{-3}$, which corresponds to $\rho'$ $0.0045 + 0.002$ Ohm-cm; direct current $i_o$ is fed to the strain-sensitive bridge circuit (FIG. 3). In this case the condition which has to be satisfied to ensure temperature stability of the output signal is described by equation (6'). FIG. 5 is a plot of the sum total of the resistance temperature coefficient and gauge factor temperature coefficient for monocrystal p-type silicon films on a sapphire substrate versus the resistivity $\rho$ of the films. The plot of FIG. 5 makes it clear that the condition (6') is met for the selected resistivity range within a broad range of temperatures, i.e. at least from $-100°$ to $+200°$ C., and that the output signal of the strain-sensitive circuit is independent of temperature within this range (broken curve 9 in FIG. 11).

Figure 6:
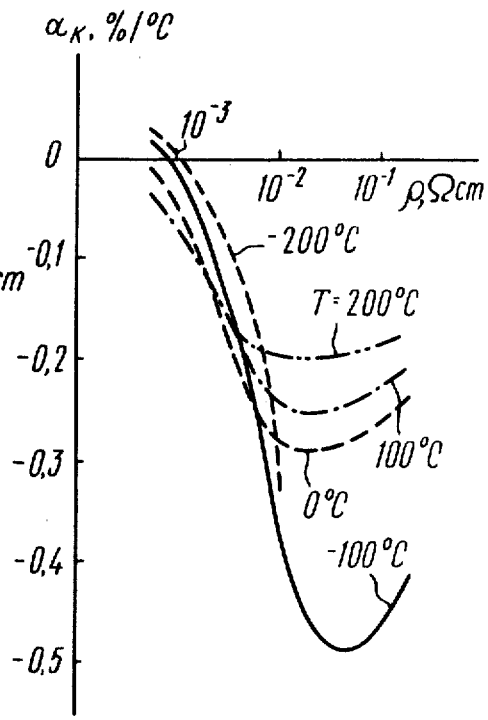
FIG. 6 is a graph, showing a plot of the gauge factor temperature coefficient of p-type silicon films on sapphire versus resistivity.

According to another alternative embodiment of the pressure transducer of FIGS. 1 and 2, the strain gauges 5 comprise boron doped silicon film on a sapphire substrate; the hole concentration in silicon is $(1.8 + 3)10^{20}$ cm$^{-3}$, which corresponds to a resistivity of 0.0009 to 0.0006 Ohm-cm; d.c. voltage $U_o$ (FIG. 3) is fed to the strain-sensitive bridge circuit. In this case the condition for temperature stability of the output signal is described by (6). FIG. 6 is a plot of the gauge factor temperature coefficient of p-type silicon film on sapphire versus the resistivity $\rho$ of the film. As is seen from the plot, for the selected resistivity range the condition (6) is practically met within a broad range of subzero temperatures from at least $-200°$ to $0°$ C. so that within this range the output signal is almost independent of temperature (dot-and-dash curve 10 in FIG. 11).

Figure 7:
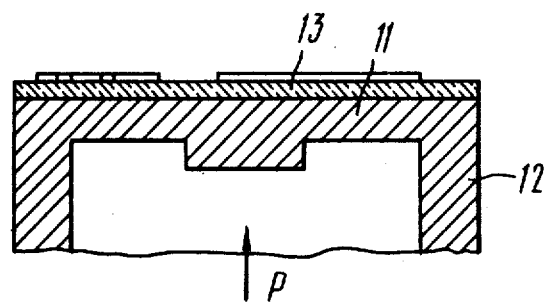
FIG. 7 is an elevational, sectioned view of a sensitive element of a semiconductor pressure transducer in accordance with the invention, featuring two strain-sensitive circuits.
Figure 8:
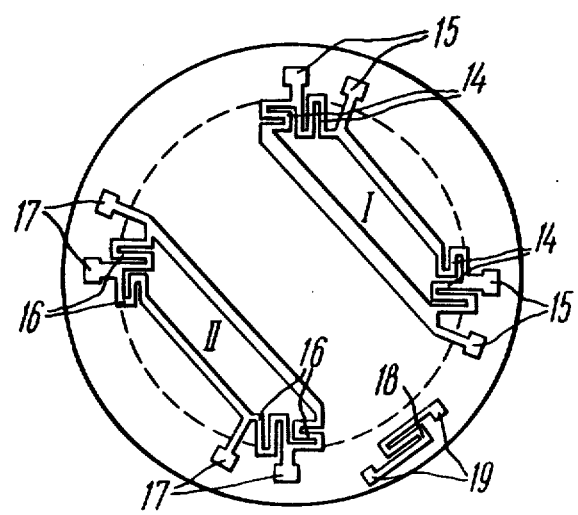
FIG. 8 is a top, plan view of the transducer of FIG. 7.

Another alternative embodiment of the strain gauge transducer according to the invention is shown in FIGS. 7 and 8.

This embodiment comprises a metal membrane 11 which is integral with a body 12 containing a cavity which pressure P is applied (the pipe connection which serves to apply pressure to said cavity is not shown in FIG. 7). Attached by any known method, such as soldering, to the membrane 11 is a sapphire substrate 13 cut out in the crystallographic plane ($\bar{1}012$). The substrate 13 carries epitaxial strain gauges 14 of boron-doped silicon film with a hole concentration of $(3.5 + 9)10^{19}$ cm$^{-3}$. The strain gauges 14 are arranged at the edge of the membrane 11 and oriented in the crystallographic directions [110] and [$\bar{1}$10] of silicon; said strain gauges 14 are arranged in pairs so that one strain gauge of a pair is parallel to the radius of the membrane 11, while the other gauge of the pair extends at a perpendicular to the radius of said membrane 11. The strain gauges 14 are interconnected into a bridge circuit I with contact areas 15 (see FIG. 9). Formed on the surface of the substrate 13 by the selective boron diffusion method are epitaxial strain gauges 16 of boron-doped silicon film with a hole concentration of $(1.8 + 3)10^{20}$ cm$^{-3}$. Like the gauges 14, the strain gauges 16 are arranged at the edge of the membrane 11 and oriented in the crystallographic directions [110] and [110]; they are arranged in pairs so that one gauge 16 of a pair is parallel to the radius of the membrane 11, while the other gauge 16 of the pair extends at a perpendicular to the radius of said membrane 11; the strain gauge 16 are interconnected into a bridge circuit II with contact areas 17. The substrate 13 further carries an epitaxial thermistor 18 with contact areas 19. The thermistor 18 is of boron-doped silicon film with a hole concentration of $3.5 \cdot 10^{19}$ to $3 \cdot 10^{20}$ cm$^{-3}$. In the embodiment under review, the thermistor 18 is arranged in a non-strained area of the substrate 13, above the side wall of the body 12. The thermistor 18 may also be oriented in the strain-insensitive direction of the sapphire substrate 13.

Figure 9:
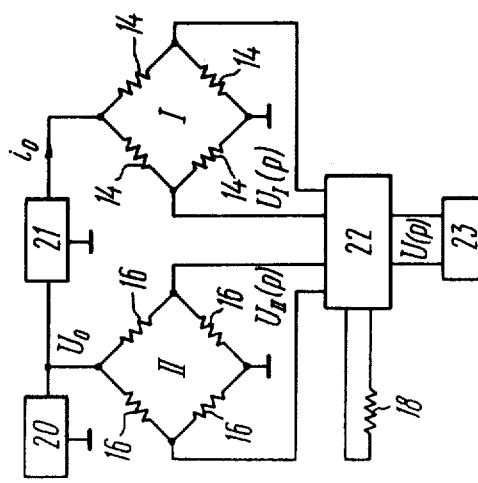
FIG. 9 is a block diagram of the transducer of FIGS. 7 and 8.

A d.c. voltage source 20 serves to feed d.c. voltage $U_o$ to the bridge circuit II (FIG. 9). A d.c. source 21 serves to feed direct current $i_o$ to the strain-sensitive bridge I. The values of $U_o$ and $i_o$ are selected so that, at a certain temperature $t_o$ within the range of $-100°$ C. to $0°$ C. (for example, at $t_o = -50°$ C.) and at a certain pressure P, the magnitudes of the output signals of the strain-sensitive circuits I and II are equal, i.e. $U_I(P) = U_{II}(P)$. The outputs of the strain-sensitive circuits I and II are connected to inputs of a controlled relay-type switching element 22, such as a flip-flop. The output of the switching element 22 is connected to an input of a signal conversion unit 23. The control circuit of the switching element 22 contains the thermistor 18. The resistance R(t) of the thermistor 18 is selected so that, for example, at $t_o = -50°$ C., $R(t_o) = R_o$, where $R_o$ is the resistance at which one stable state of the switching element 22 is caused to change to the other.

The semiconductor pressure transducer of FIGS. 7, 8 and 9 operates as follows.

Figure 10:
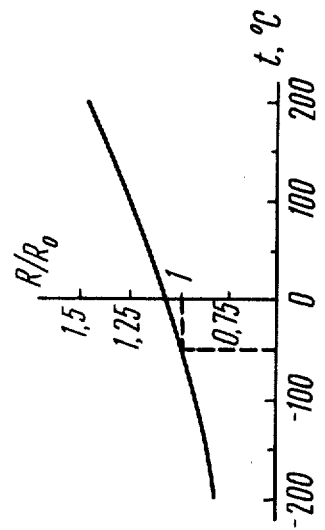
FIG. 10 is a graph, showing a plot of the relative change of resistance of the thermistor versus temperature.

As pressure P (FIG. 7) is applied to the membrane 11, the sapphire substrate 13 bends with the membrane 11. The silicon strain gauges 14 and 16 are strained so that output signals $U_I(P)$ and $U_{II}(P)$ are produced at the outputs of the strain-sensitive circuits I and II, respectively. In the subzero temperature range, such as the range of $-200°$ to $-50°$ C., the resistance R(t) of the thermistor 18 is lower than $R_o$ (FIG. 10); as a result, the state of the switching element 22 is such that the output signal $U_{II}(P)$ of the strain-sensitive circuit II is applied to the input of the signal conversion unit 23; the $U_{II}(P)$ signal is independent of temperature within the above-mentioned temperature range (curve 10 of FIG. 11). With $t_o = -50°$ C., the resistance of the thermistor 18 is equal to $R_o$ (FIG. 10) so that the state of the switching element 22 is abruptly reversed and the output of the strain-sensitive circuit I is connected to the input of the signal conversion unit 23. The $U_I(P)$ signal is independent of temperature within the range of, say, $-50°$ to $+200°$ C. (curve 9 of FIG. 11). Within the latter temperature range, the resistance of the thermistor 18 is greater than $R_o$ (FIG. 10), so that the stable state of the switching element 22 is maintained. As the temperature falls, the state of the switching element 22 is reversed with $R(t) = R_o$, i.e. with $t_o = -50°$ C.

Thus the output signal of the switching element 22 is independent of temperature throughout the working temperature range (solid line 24 of FIG. 11):

$$U(P) = \begin{cases} U_I(P) \text{ at } -50° \text{ C.} \leq t \leq +200° \text{ C.} \\ U_{II}(P) \text{ at } -200° \text{ C.} \leq t \leq -50° \text{ C.} \end{cases}$$

What is claimed is:

1. A semiconductor strain gauge transducer comprising: a sensitive element including a monocrystal sapphire substrate; epitaxial strain gauges made of silicon resistors of p-type conduction, arranged on said substrate and interconnected into a bridge or differential strain-sensitive circuit; a signal conversion unit whose input is connected to the output of said strain-sensitive circuit, wherein the hole concentration in the silicon is $3.5 \cdot 10^{19}$ to $3 \cdot 10^{20}$ cm$^{-3}$.

2. A semiconductor strain gauge transducer as claimed in claim 1, wherein the power source for said strain-sensitive circuit is a d.c. current source, and the hole concentration in the silicon of said strain-sensitive resistors is $(3.5+9) \cdot 10^{19}$ cm$^{-3}$.

3. A semiconductor strain gauge transducer as claimed in claim 2, further comprising: an additional strain-sensitive circuit similar to said basic strain-sensitive circuit, the power source for said additional strain-sensitive circuit being a d.c. voltage source, and the hole concentration in the silicon of the strain gauges of said additional strain-sensitive circuit being $(1.8+3) \cdot 10^{20}$ cm$^{-3}$; a relay-type switching element connected to the outputs of the two strain-sensitive circuits and to the input of said signal conversion unit; a control circuit of said switching element; and an epitaxial thermistor connected to said control circuit of said switching element, said epitaxial thermistor being made from silicon with a hole concentration of $3.5 \cdot 10^{19}$ to $3 \cdot 10^{20}$ cm$^{-3}$ and located in a non-strained zone or oriented in the strain-insensitive direction of said sapphire substrate.

4. A semiconductor strain gauge transducer as claimed in claim 1, wherein the power source for said strain-sensitive circuit is a d.c. voltage source, and the hole concentration in the silicon of said strain-sensitive resistors is $(1.8+3) \cdot 10^{20}$ cm$^{-3}$.

* * * * *